United States Patent [19]
Gilbert

[11] Patent Number: 5,571,056
[45] Date of Patent: Nov. 5, 1996

[54] DERAILLEUR CABLE COLLET

[76] Inventor: Raymond D. Gilbert, 6501 Inwood Dr., Springfield, Va. 22150

[21] Appl. No.: 422,533

[22] Filed: Mar. 31, 1995

[51] Int. Cl.⁶ .................................................. F16H 59/00
[52] U.S. Cl. .......................... 474/80; 74/594.3; 280/238
[58] Field of Search ................... 474/78, 80; 74/394.1, 74/594.3; 280/236, 238

[56] References Cited

U.S. PATENT DOCUMENTS

| | | | |
|---|---|---|---|
| 4,421,334 | 12/1983 | Efros | 280/236 |
| 4,509,742 | 4/1985 | Cones | 74/594.1 |
| 4,598,920 | 7/1986 | Dutil et al. | 280/236 |
| 5,197,927 | 3/1993 | Patterson et al. | 474/80 |
| 5,201,236 | 4/1993 | Nagano | 474/80 X |
| 5,254,044 | 10/1993 | Anderson | 474/80 X |
| 5,356,348 | 10/1994 | Bellio et al. | 474/80 X |
| 5,356,349 | 10/1994 | Browning | 474/78 |
| 5,357,177 | 10/1994 | Fey et al. | 474/80 X |
| 5,390,947 | 2/1995 | Pong et al. | 280/286 |
| 5,407,396 | 4/1995 | Gilbert | 474/80 |

*Primary Examiner*—Roger J. Schoeppel
*Attorney, Agent, or Firm*—Raymond D. Gilbert

[57] ABSTRACT

The derailleur cable-collet system is an automatic pedal-rate to wheel-rate adjusting system. Pedal pressure is sensed at the crankshaft hub and electronically compared to pedal-pressure threshold values entered by the rider into an electronic circuit. Pedal velocity is sensed at the front sprocket and electronically compared to velocity threshold values. Shifting decision logic is relayed to feed battery current into solenoid-driven collets that move derailleur cables. An arc-jaw collet moves derailleur cable in one direction, and employs spring-forms for structure and bias. A distribution circuit senses travel limits of derailleur arms and redirects cable travel to another derailleur chain-guiding apparatus. A pedal-position sensor contributes to a pedal shifting time circuit that minimizes chain force during sprocket-shifting actions.

20 Claims, 5 Drawing Sheets

1. Transducer (8) expresses force as impedence.

2. Setting circuit (32) combines multiple impedence values.

3. Threshold comparing circuit (14) measures impedences of transducer and threshold settings on bridge (33) legs.

4. Transistor (34) latch reacts to change in bridge current.

5. First relay (35) couples battery (36) to power circuit (44).

6. Pedal-position sensor (75) closes power circuit to first force relay (80) to wheel downshift pedal force collet (4).

7. Limit switch (78) for largest rear sprocket cancels 80 and powers second force relay (81) to pedal-upshift collet (6.3).

Fig 10

1. Transducer (15) expresses velocity as function of impedance.

2. Velocity setting circuit (42) combines impedence values.

3. Threshold comparing circuit (14) measures impedences of transducer and threshold settings on bridge (33) legs.

4. Transistor (34) latch reacts to change in bridge current.

5. First relay (35) couples battery (36) to power circuit (44).

6. Pedal-position sensor (75) closes power circuit to first velocity relay (82) to wheel upshift velocity collet (5).

7. Limit switch (79) for smallest rear sprocket cancels 82 and powers fourth distrib. relay (83) to pedal dwnshift collet (6.4).

Fig 11

DERAILLEUR CABLE COLLET

CROSS-REFERENCES TO RELATED APPLICATIONS

U.S. Ser. No. 08/181,294, now U.S. Pat. No. 5,407,396. Statement as to rights to inventions made under Federally-sponsored research and development: None

BACKGROUND OF THE INVENTION

1. Field of the Invention

This invention utilizes sets of an arc-jaw collet mechanism to move a derailleur cable core of a person-powered vehicle such as a bicycle. The collet takes power from an electric relay whose input includes a battery and electric instruction from pressure and frequency transducers which sense pedal pressure and pedal velocity. Bridge circuits and solenoids link sensing logic with chain shifting apparatus.

2. Description of Related Art

Riding a bicycle inflicts two physiological problems:

1. Heavy pedal forces at a slow-pedal rate delivers less than optimum work from the human body and, if sustained, can induce muscle damage.
2. High-velocity pedal travel at light pedal force also delivers less than optimum work from the human body yet accelerates fatigue.

Many human-power vehicles provide the rider with a manual control over pedal to wheel ratio. A hand-operated derailleur system is common.

However, manual management of levers or grips for as many as eight rear wheel sprockets and three pedalled sprockets does not usually offer optimized transfer of work from the rider into the bicycle.

One prior art automatic shifter (U.S. Pat. No. 4,598,920) automatically adjusts the pedal-to-wheel turning ratio for a set of rear wheel sprockets by sensing radial force from the rear wheel turning velocity and adjusting the rear-wheel driving chain with a derailleur guide. As vehicle speed increases, the pedal-to-wheel turning rate is reduced in the ratio steps available from a rear wheel set of sprockets.

A shifter described in application Ser. No. 08/181,294, now U.S. Pat. No. 5,407,396 (Chain Shifter) senses mechanical forces within a segment of chain in comparison to a pre-set threshold chain-force, with mechanical apparatus to adjust rear and front derailleur cable actions for an increased pedal-to-wheel turning rate. The shifter also senses a pattern of low chain forces and actuates cams to reduce the pedal-to-wheel turning rate. A pulse converter accepts oscillating signals from force sensors and moves derailleur cables.

A problem in shifting a derailleur cable in two directions with a combination of manual and automatic means is to disconnect automatic means from the cable when motion is not being applied. Conventional collets advance a shaft in one direction and then hold the shaft firmly. Such collets are commonly used as tooling for an engine lathe.

SUMMARY OF THE INVENTION

The derailleur cable collet system moves a derailleur cable by controlled release of stored energy. Sensors of pedal force and pedal velocity provide parameters for comparison with threshold parameter values. When pedal force exceeds a set threshold, stored energy is released into a collet which moves a bicycle derailleur cable to downshift chain travel and induce a higher pedal-to-wheel ratio of easier pedalling.

When pedal velocity exceeds a set threshold, combined from multiple inputs, stored energy is released into a second collet whose cable movement will upshift a derailleur apparatus to induce a lower pedal-to-wheel ratio of slower pedalling.

A light-weight cable-moving collet responds to breached threshold values to move a cable one direction, and to accommodate other free cable travel. The collet mechanism converts stored energy of forward solenoid pulses into cable movement, and releases resistive contact with the cable by a "broken lever" return action.

Sensors for pedal force and velocity are located near the bicycle's hub, and transducers convert mechanical parameters to computer-circuit inputs. A cable-motion distributor senses limits to automatic shifting of rear derailleur, and directs selected automatic shifting to a front derailleur apparatus.

BRIEF DESCRIPTION OF THE DRAWING:

FIG. 1. A Derailleur Cable Collet System
FIG. 2. A Bicycle with Cable Collet Components
FIG. 3. A Frame-Mounted Pedal Force Transducer
FIG. 4. A Pedal Motion Transducer
FIG. 5A. An Arc-Jaw Collet with Cable-Core
FIG. 5B. An arctravel collet mechanism
FIG. 6. A Collet-driving Circuit
FIG. 7. An Automatic Shift Module
FIG. 8. A Seat-Force Transducer
FIG. 9. A Pedal-Force Collet-Driving Algorithm
FIG. 10. A Pedal-Velocity Collet-Driving Algorithm
FIG. 11. A Work Load Meter Circuit

DESCRIPTION OF PREFERRED EMBODIMENTS

A rear wheel derailleur (FIG. 2-1) is connected to a first cable (FIG. 2—2) whose cable core (FIG. 5-3) passes through a peak downshifting pedal-force collet (FIG. 2-4; 6-4; 9-4) and a pedal velocity collet (FIG. 2-5; 6-5; 10-5). A pedalled sprocket derailleur (FIG. 2-6) shifts sprocket positions using a forward chain-guide (FIG. 2-6.1) and is connected to a second cable (FIG. 2-6.2) which communicates with an upshifting pedal force collet (FIG. 2-6.3; 6-6.3; 9-6.3) and a second pedal velocity collet (FIG. 2-6.4; 6-6.4; 10-6.4). A rider's force upon a pedal (FIG. 2-7) is sensed in a force transducer (FIG. 3-8; 9-8) as compression between a crank bearing outer surface (FIG. 3-9) and a vertical surface spot (FIG. 3-10) within a bottom frame bracket (FIG. 3-11). A second crank-bearing (FIG. 3-9.1) provides structural freedom to transmit pedal-crank force against the bicycle frame.

The force-transducer senses compression force from the coupling of forces through a chain (FIG. 3-12), horizontally reacting to vertical force components of the pedal. A peak force is transmitted into the transducer when the pedal's crank (FIG. 3-13) is at its horizontal position.

The transducer converts a mechanical compression force into an electrical parameter, such as impedance, that is proportional to stress. Current is communicated through the impedance of a pedal-force parameter circuit (FIG. 3-13.1, 6-13.1) to a threshold comparing circuit (FIG. 6-14; 9-14).

A rider's pedalling cadence is sensed by a pedal motion transducer (FIG. 4-15; 10-15) and a velocity parameter circuit (FIG. 4-15.1, 6-15.1). Regularly spaced radial points (FIG. 4-16) are located on an inward-facing surface (FIG. 4-17) of a pedal-driven sprocket set (FIG. 2-18).

Passage of radial points across the face of a pulse sensor (FIG. 4-19) alters parameters of a resistive capacitor circuit (FIG. 6-20) to convert rate of point passage to a variable electric output such as current flow.

The threshold comparing circuit (FIG. 6-14) converts current rate into impedance parameters that are proportional to velocity. The circuit drives a pedal-speed indicator (FIG. 7-21) and provides input to discriminating switching circuits (FIG. 6-22), such as transistors.

Electric parameters from the pedal-force transducer pass through communication lines (FIG. 2-23) to a collet driving circuit (FIG. 6-24) within to vehicle shift module (FIG. 7-25).

The module face shows a pedal - force meter ( FIG. 7-26 ), a pedal-speed meter (FIG. 7-21), a force option selector (FIG. 7-28), a pedal-speed option selector (FIG. 7-28), a biological range setter (FIG. 7-29), a downshift override switch (button) (FIG. 7-30) and an upshift override switch (button) (FIG. 7-31).

Figure 9:
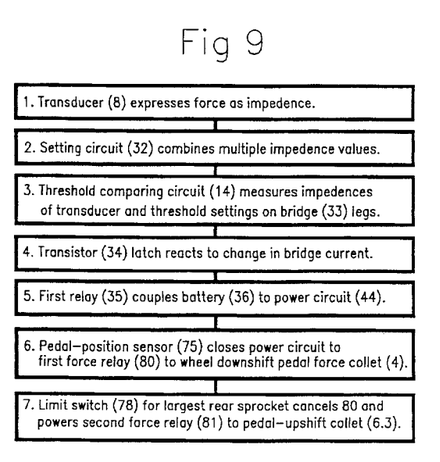
Figure 10:
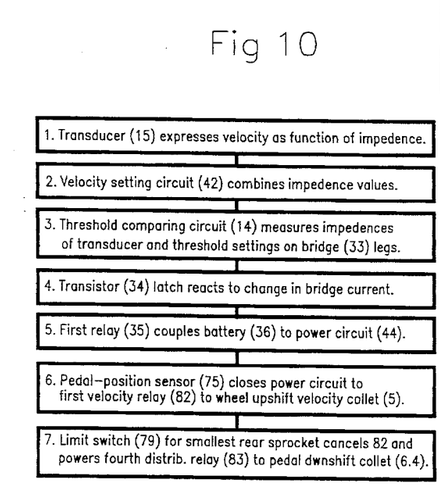

Force-threshold setting circuits (FIG. 9-32) compare parameters from pressure transducers (FIG. 9-8) with selected, combined input parameters. A resultant current flow within a bridge (FIG. 6-33) triggers a transistor latch (FIG. 10-34) to actuate and hold a first force relay (FIG. 9-35) from a battery (FIG. 9-36) to drive a pedal-force collet (FIG. 9-4).

A combination work load circuit (FIG. 11-37) is an amplifier (FIG. 11-38) having inputs from the pedal force transducer (FIG. 11-8) in force circuit (FIG. 11-39) and the pedal velocity transducer (11-15) in pedal-speed circuit (FIG. 11-40). The amplified signal is averaged in a resistive capacitor to be fed into a "work load" figure-of-merit meter (FIG. 11-41). This meter summarizes a rider's current net performance.

Figure 6:
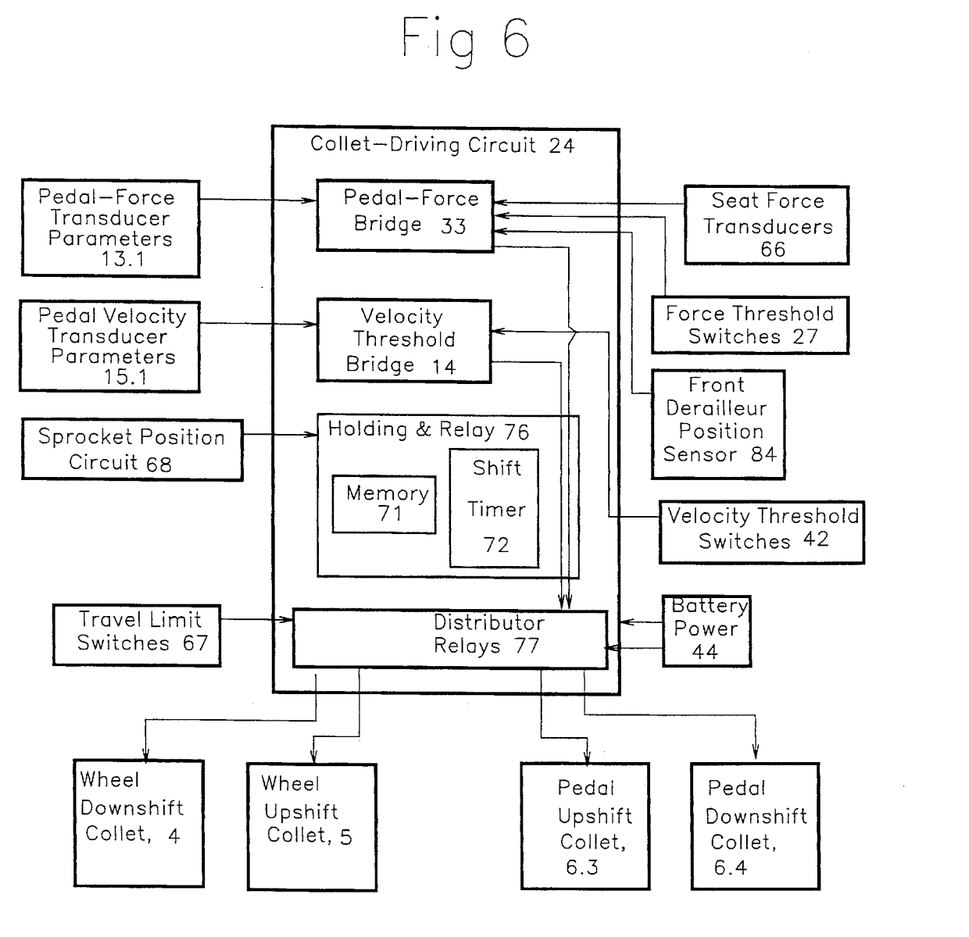
Figure 7:
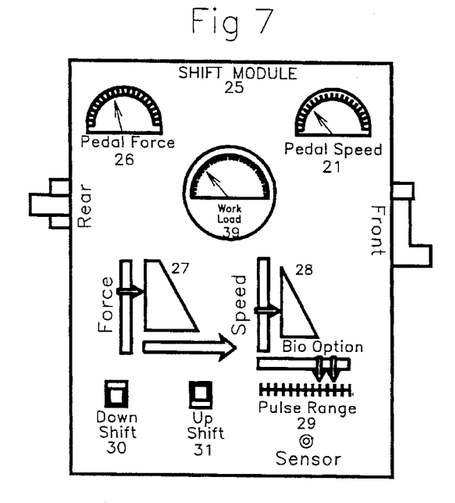

A velocity-threshold setting circuit (FIG. 10-42) responds to speed option settings (FIG. 7-28) and is input to the velocity threshold bridge circuit (FIG. 6-14). The bridge output passes through holding and relay apparatus to relays that drive the wheel upshift collet (FIGS. 6-5; 10-5) or pedal downshift collet (FIGS. 6-6.4; 10-6.4).

Each cable-moving collet (FIG. 5A) is attached to a frame (FIG. 2-43) portion of the bike and is connected to a battery (FIG. 2-36) in a power circuit (FIG. 9-44).

An arc-travel collet mechanism (FIG. 5A-45) is mounted on the frame through a foundation piece (FIG. 5A-46) that supports a collet-driving solenoid (FIG. 5A-47), an outwardly extended shaft (FIG. 5A-48) and a top horizontal spring segment (FIG. 5A-49) of a spring form.

The spring form bends its forward vertical spring arm (FIG. 5A-50) downwardly and bends the arm's end (FIG. 5A-51) horizontally outward.

The outwardly bent end fits into a forward swinging-port bearing (FIG. 5A-52) of a bed (FIG. 5A-53) whose top axial surface (FIG. 5-54) is slanted upwardly toward a forward end, and whose top width surface is depressed toward its center (FIG. 5A-55). The bed surface becomes a bottom jaw (FIG. 5A-56) on which a cable core (FIG. 5A-3) slides. A second bearing (FIG. 5A-57) supports the second end of the bed.

A spring-form trapeze (FIG. 5A-58, 5B-58) rotates on the outwardly extended shaft (FIG. 5-48) and extends downward ½ way to the top surface level of the cable core as it lies at the bottom jaw bed.

Figure 1:
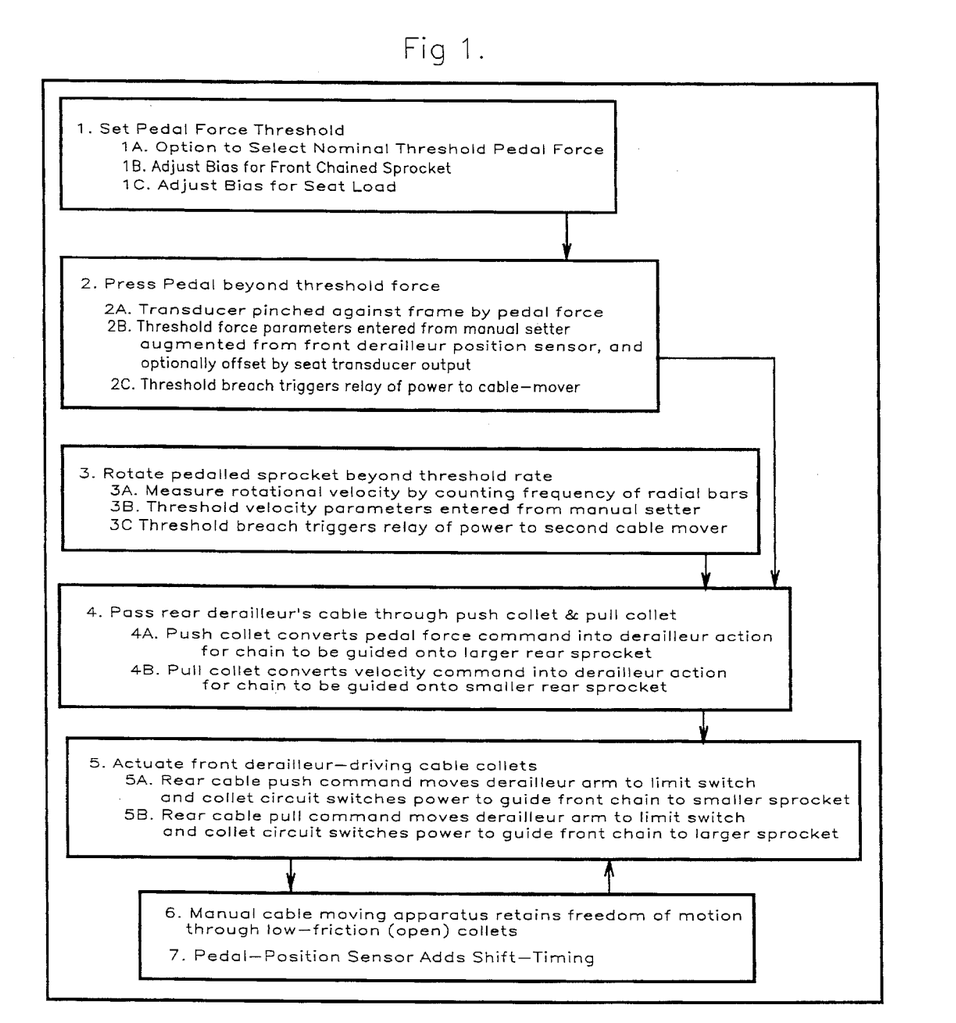
Figure 2:
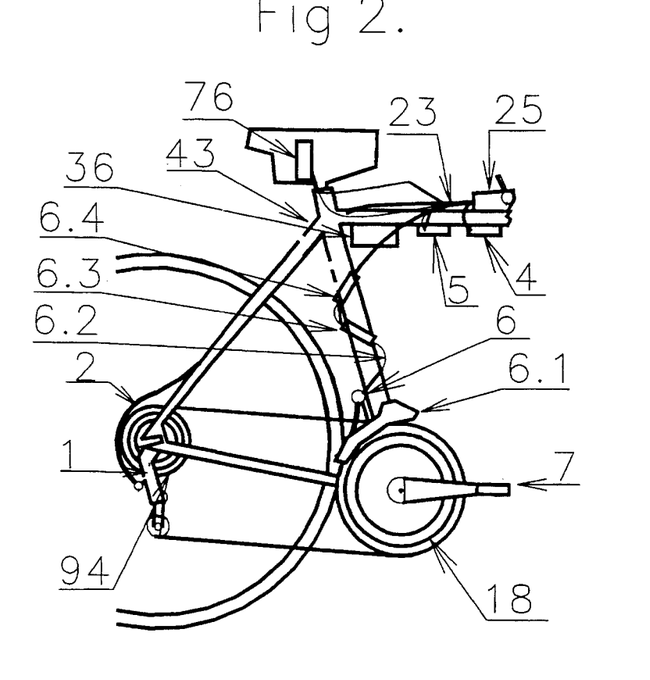
Figure 3:
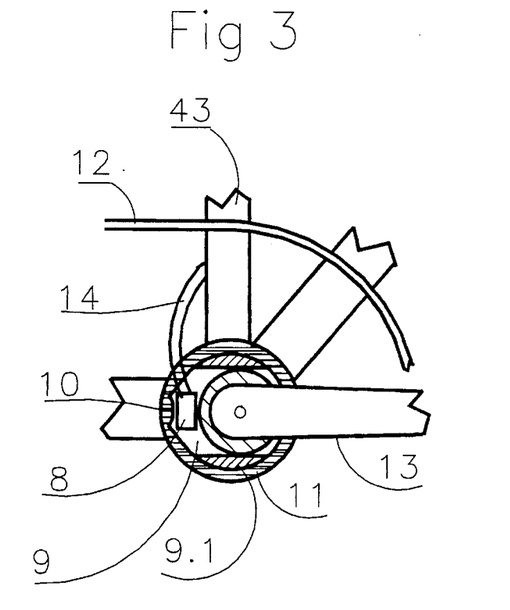
Figures 4, 5A:
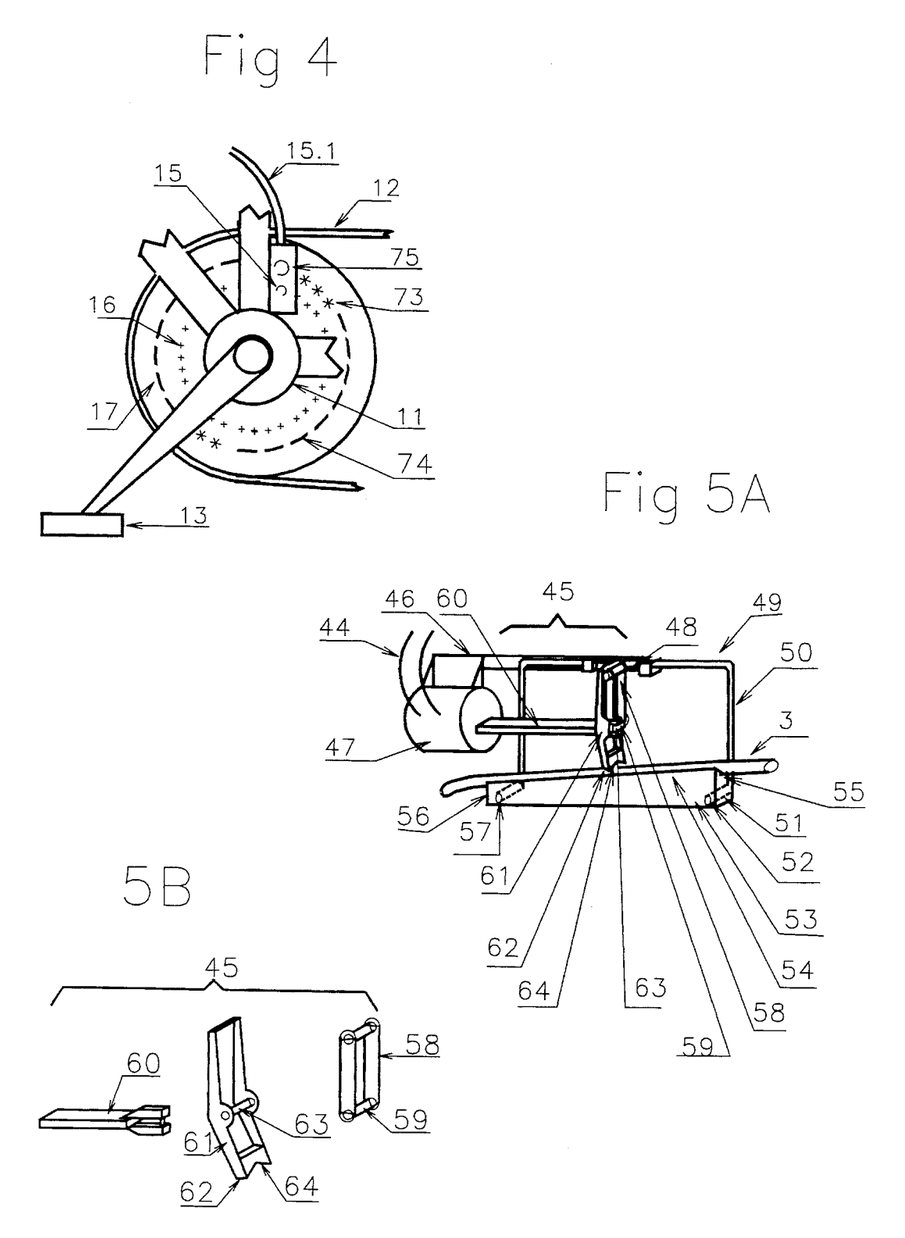

A bottom bar (FIG. 5A-59, 5B-59) of the trapeze connects to the solenoid's energy transfer bar (FIG. 5A-60, 5B-60). Stiff arms (FIG. 5A-61, 5B-61) connect to the ends of a downward-facing top jaw (FIG. 5A-62, 5B-62) and midpoint bearings (FIG. 5A-63, 5B-63) connect the arms to the trapeze bottom bar, and passing the energy transfer bar through the stiff arm to also connect to the bottom bar. The stiff arms of the top jaw extend upwardly beyond the shaft on which the trapeze swings.

The cable core passes through the arc-travel collet to lie on the bed of the lower jaw until solenoid action advances the trapeze bar. The bar rotates the stiff arms of the top jaw to bring a top jaw surface (FIG. 5A-64, 5B-64) in contact with a slanted top surface of the cable core.

Compression of the cable core against the slanted bed rotates forward spring arm (FIG. 5A-50) and the trapeze to the end of the solenoid's stroke.

Reverse motion of the energy transfer bar (FIG. 5A-60, 5B-60) draws the midbearing of the top jaw to "break" the compressive link of the top jaw and the trapeze, releasing compressive downward pressure against the cable core and releasing the vertical spring arm to return the bed with very low friction against the cable core.

Figure 8:
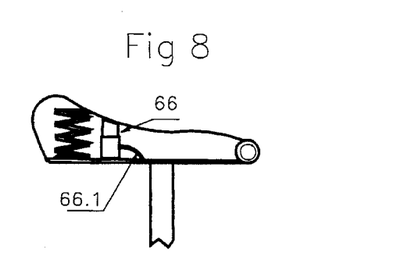
Figure 11:
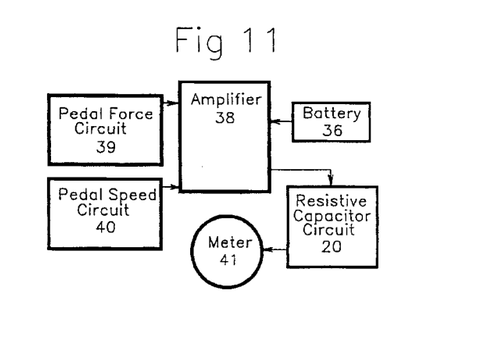

A collet driving circuit (FIG. 6-24) draws inputs from a pedal-force parameter circuit (FIG. 6-13.1), a pedal-velocity parameter circuit (FIG. 6-15.1), a seat-force transducer circuit (FIG. 8-66) a derailleur rear-wheel travel-limit circuit (FIG. 6-67), a derailleur pedalled sprocket position circuit (FIG. 6-68), manually-adjusted pedal-force threshold value-setting (switch) circuits, (FIG. 6-27), manually-adjusted velocity threshold value-setting (switch) circuits (FIG. 6-28), and pedal-position memory series switch circuits (FIG. 11-71).

The collet-driving circuit draws power from a battery, compares bridge-circuit values, and triggers relays to transmit power to collet-driving solenoids.

A bridge circuit (FIG. 6-33) within the pedal-force collet driving circuits compares input parameter values from a transducer circuit and combines parameter values from threshold-setting circuits. When sensed transducer values exceed threshold values, a transistor actuates relays connected to collets that are oriented for pull motion to a rear wheel derailleur system or for push motion to a pedalled sprocket derailleur system.

A pedal position shift-timer (FIG. 6-72) locates grouped teeth (FIG. 4-73) on two segments of an inward-facing sprocket-ring (FIG. 4-74) whose radius passes a position sensor (FIG. 11-75).

Pedalled rotation of the sprocket passes the teeth across the position sensor to communicate a switching signal into the holding and relay circuit. An optimum readiness for shifting occurs when minimum force is being transferred between the pedal and the wheel. Normally the low force transfer between a rider and pedal occurs when a pedal crank is parallel to a rider's most-straightened leg.

The sensor connects to a holding and relay circuit (FIG. 6-76) that accepts shifting instruction parameters from threshold circuits, and delays powering of relays to collet-driving circuits.

A cable-motion distributor (FIG. 6-77) connects a minimum rear arm limit switch (FIG. 9-78) and a maximum rear arm limit switch (FIG. 10-79) to relays. When initial cable motion presses the minimum rear arm limit switch, the distributor circuit stops further solenoid current through a first distributor relay (FIG. 13-80) to terminate movement of the rear derailleur cable (FIG. 2—2), and initiates a solenoid current through a second distributor relay (FIG. 13-81) to move the second cable (FIG. 2-5.1) that upshifts (FIG. 6-6.3) the front derailleur.

Similarly, when initial cable motion presses the maximum rear arm limit switch, a third distributor relay (FIG. 10-82) terminates service to the rear derailleur, and initiates a fourth distributor relay (FIG. 10-83) to downshift the front derailleur.

A cancelled down-shift movement of the first cable collet converts to an up-shift movement of the second cable collet. Thus a cancelled command to reduce a pedal-to-wheel ratio by shifting the chain to a larger rear wheel sprocket becomes a command to reduce a pedal to wheel ratio by shifting the chain to a smaller front sprocket.

A front derailleur position sensor (FIG. 6-84) attaches to the front derailleur cable and communicates with the pedal-force threshold setting portion of the pedal-force bridge (FIG. 6-33).

I claim:

1. A cable collet comprising:

a pedal-driven vehicle with frame, wheels, pedals, chain, sprockets and derailleur apparatus further comprising cable-arm, cable-core and chain-guides; and a stored energy means, a cable moving means, a chain-shifting instruction means, and, a chain-shifting communication means;

wherein the stored energy means, the cable moving means and the chain shifting instruction means are connected to the chain-shifting communication means, and all are attached to the vehicle; and, wherein the chain shifting instruction means further comprises a downshifting switch; and wherein the communicating means further comprises a relay; and wherein the stored energy means further comprises a battery;

wherein the cable moving means includes a cable-driving pedal-force collet, connected to a driving solenoid and oriented to move a derailleur cable in a first-direction;

whereby the switch, when triggered, closes the relay to connect the battery to the cable-driving collet; and the collet advances the cable core to guide a moving chain onto a larger sprocket in a coaxial rear sprocket set.

2. A cable collet of claim 1 further comprising:

a second cable-moving means;

wherein the chain shifting instruction means further comprises an upshifting switch; and wherein the chain shifting communication means connects the switch to a second relay, connectively fed by the battery to the second cable moving means which is oriented to move the derailleur cable in a second-direction;

whereby the second-direction cable movement guides the moving chain to a smaller coaxial rear sprocket.

3. A cable collet of claim 1 wherein the cable moving means further comprises an arc-jaw cable-moving collet.

4. A cable collet of claim 1 including a arc-jaw cable-moving collet comprising:

a foundation piece, an energy transfer bar, a top horizontal spring segment, a spring form vertical arm, a slanted, rocking bed, a second bed-supportive bearing, an outward top shaft, a trapeze shaped from, a top jaw side arms
      with mid-point bearing;

wherein the foundation piece is attached to the frame of a vehicle, such as a bicycle, and holds the top horizontal spring segment; and wherein a spring-form vertical arm rotatingly supports a first end of the slanted, rocking bed, whose top surface is shaped to support a length of cable core, and whose first end top surface is slanted upward to cross the travel arc of the top jaw; and wherein the top shaft extends outwardly from the foundation piece, and provides a rotational bearing for the trapeze shaped form whose bar hangs at a midpoint toward the bed surface; and wherein the top jaw hangs from the trapeze bar on mid-point bearings of the side arms which extend stiffly from the top jaw upwardly beyond the top shaft; and wherein the trapeze bar is also an end bearing to the energy transfer bar;

whereby a forward motion of the energy transfer bar rotates the trapeze on its top shaft to also rotate the top jaw into contact with the cable core as it lays in the sloped bed, and the jaw, core, and bed continue a forward angular motion to the completion of the transfer bar's arc of travel; whereat a return travel motion of the transfer bar "breaks" the compression link between the trapeze and the top jaw, releasing cable-core pressure on the bed, permitting its return without further movement of the cable core.

5. A cable-moving collet of claim 4 further comprises:

a solenoid;

wherein the solenoid is attached to the foundation piece and an end of the solenoid's transfer bar grasps the trapeze bar.

6. A cable collet of claim 1 wherein the chain-shifting instruction means further comprises:

a pedal force measuring means, a pedal force threshold setting means, and a force-comparing means.

7. a cable collet of claim 6 wherein the pedal force measuring means further comprises:

a force transducer, a pedal-crank bearing outer surface, a second pedal-crank bearing, a frame surface spot, and a transducer circuit path;

wherein the pedal crank bearing is connected with the frame through the second pedal-crank bearing;

wherein the force transducer is mounted on the frame to contact pressure conducting surfaces of the pedal-crank bearing and the frame, and is connected to the circuit path into the force comparing means; and wherein a first pressure sensing surface of the transducer contacts the pedal crank bearing outer surface and a second pressure sensing surface contacts the frame surface spot; and wherein compression of the transducer induces electrical parameters of the transducer circuit path which connects to a pedal-force bridge circuit;

whereby torsional pedal force is communicated through the pedal crank bearing, and resultant horizontal force is pressed from the bearing outer surface through pressure sensing surfaces of the force transducer to the frame surface spot, and electric parameters are communicated through transducer circuit paths to pedal-force comparison circuits.

8. a cable collet of claim 6 wherein the pedal force threshold setting means further comprises:

force option selector wherein the pedal-force option selector displays optional ranges of pedal forces at which downshifting will be initiated automatically; and wherein switching means empower a person to select from displayed options whereby rider preferences are communicated to threshold comparing circuits.

9. a cable collet of claim 8 further comprising:

a seat force transducer;

wherein a strain transducer is mounted between a bicycle seat surface and the bicycle frame; and wherein a circuit connects the transducer to the pedal-force threshold setting means;

whereby the seat force transducer contributes information to a force threshold setting circuit regarding a seated weight of the rider.

10. a cable collet of claim 8 further comprising:

a front derailleur position sensor wherein a front derailleur apparatus is connected to a second cable, and operation of the front derailleur apparatus alters the lever arm ratio of pedal force to horizontal chain force; and wherein the cable to the front derailleur apparatus is connected to the front derailleur position sensor which is also mounted on the frame; and wherein an electrical parameter from the sensor characterizes each position of the derailleur cable, and a sensor circuit communicates selected sensor parameters to the force comparing means such as a threshold bridge circuit.

11. a cable collet of claim 6 wherein the force-comparing means further comprises:

a bridge circuit wherein the bridge circuit discriminates a change in direction of current flow when parameter values of the pedal-force transducer in the bridge's first leg become greater than parameter values of threshold values in a second leg;

whereby a current-direction change in a bridge output circuit becomes a force-comparing means that actuates a relay to drive a chain shifting collet-solenoid.

12. a cable collet of claim 6 further comprising:

a shifting-power communication means, wherein the shifting power communication means such as a relay circuit connects the battery to the collet's solenoid when the force comparing means experiences a breach of threshold parameters.

13. A cable collet of claim 2 wherein the chain-shifting instruction means further comprises:

a rotational movement transducer means, a pedal velocity threshold setting means, further comprising a velocity-option selector, and threshold setting circuits, further comprising a discriminating circuit such as a bridge circuit;

wherein the rotational movement transducer communicates parameter values to a first leg of a discriminating circuit; and wherein the threshold setting means communicates to the second leg of the discriminating circuit; and whereby the discriminating circuit communicates instruction to a chain-shifting communication means.

14. A cable collet of claim 13, wherein the rotational movement transducer means further comprises:

a pedal velocity measuring means, further comprising:

a sprocket-set surface having a ring of points, and a pedal motion transducer further comprising:

a point-reader, an electric pulse generator and an averaging means;

a conducting circuit to the chain-shifting instruction means;

wherein the transducer senses passage of points and accumulates an electric charge that is proportional to the average rate of point passage; and wherein electric parameters from the velocity measuring transducer travel along a conductor path to a first leg of a velocity comparing means such as a bridge circuit.

15. A cable collet of claim 13, further comprising;

a pedal velocity threshold setting means, further comprising;

a velocity-option selector, and threshold setting circuits; and a velocity-discriminating bridge circuit;

wherein a velocity option-selector is positioned to relate ridervisible options into electric parameters of circuits that communicate with a second leg of the velocity discriminating bridge.

16. A cable collet of claim 2 wherein the chain-shifting communication means further comprises:

a relay switching means, and a pedal position measuring means, further comprising:

an angular position sensor further comprising:

an inward-facing plate, attached to the pedalled sprocket set, further comprising a ring-set of grouped points extending from the plate, and a point-passage sensing means, and a memory means wherein the relay switching means such as transistors, mechanical latching devices and electro-mechanical switches, receive instruction to communicate battery power to solenoids which convert electric power to cable-movement;

wherein the grouped points of the first ring are positioned to pass the point passage sensing means when the angular motion of the pedal is perpendicular to the vehicle seat; and wherein the memory means, such as a capacitor circuit, stores threshold breach data from instruction means until the point passage sensing means release the information to chain-shifting communication means such as a relay;

whereby the pedal-position measuring means provides the timing signal for chain shifting during minimum force transfer between the pedal and the wheel.

17. A cable collet of claim 2 wherein the cable-moving means further comprises:

a second derailleur cable and core a second pedal-force cable moving means a second pedal-velocity cable-moving means wherein the second derailleur cable and core communicates to a derailleur apparatus attached to the frame near the pedalled sprocket hub; and wherein a second pedal force moving means such as a cable collet that shifts the chain onto a smaller front sprocket and a second pedal-velocity cable-moving means such as a cable collet that shifts the chain onto a larger front sprocket, are fitted to the second derailleur cable.

18. A cable collet of claim 2 wherein the chain shifting communication means further comprises:
a cable-motion distributor circuit further comprising;
  an upper limit switch of the first derailleur arm
  a lower limit switch of the first derailleur arm
  a second relay in the first pedal-force collet circuit
  a second pedal-force collet circuit
  a second relay in the first pedal-velocity collet circuit
  a second pedal-velocity collet circuit;
wherein the upper limit switch is connected the frame and senses cable-arm travel that exceeds derailleur capability to guide the chain to a larger sprocket than is installed; and
wherein the second relay in the first pedal-force collet circuit redirects stored energy from the first cable moving means to the second cable moving means when the limit switch of the first derailleur system signals that further shifting is not possible; and
wherein the second pedal-force cable moving means is oriented to move its core for the second derailleur and guide the chain to a smaller sprocket; and
wherein a lower limit switch is connected the frame and senses cable-arm travel that exceeds derailleur capability to guide the chain to a smaller sprocket than is installed; and
wherein the second relay in the first pedal-velocity collet circuit redirects stored energy from the first cable moving means to the second cable moving means when the limit switch of the first derailleur system signals that further shifting is not possible; and
wherein the second pedal-velocity cable moving means is oriented to move its core for the second derailleur and guide the chain to a larger sprocket.

19. A cable collet of claim 13 wherein the rotational movement transducer further comprises;
a pedal motion measuring means, further comprising:
  an angular position sensor further comprising:
    the inward-facing plate, attached to the pedalled sprocket set, further comprising
      a ring of teeth extending from the plate and
      a tooth-engagement means, and
    a rotational apparatus to convert velocity to voltage;
  wherein the ringed tooth engagement means meshes with the multiple teeth of the plate rotate an armature of a voltage generator and communicate voltage to a shifting circuit as a function of angular velocity.

20. A cable collet of claim 1, wherein the chain-shifting instruction means further comprises: work load indicator further comprising;
a pedal-force transducer
a pedal-velocity transducer
an amplifier circuit and power supply
an averaging circuit further comprising:
  a parallel capacitor and
  an adjustable resistance, and
a circuit-value display;
wherein the powered amplifier combines a force parameter from the pedal-force transducer with a motion parameter from the pedal-velocity transducer to express an instant measure of work; and
wherein an averaging circuit, further comprising a resistive capacitor circuit, connect to a display within view of the vehicle rider.

* * * * *